(12) United States Patent
Lu et al.

(10) Patent No.: US 9,311,365 B1
(45) Date of Patent: Apr. 12, 2016

(54) MUSIC IDENTIFICATION

(71) Applicant: Google Inc., Mountain View, CA (US)

(72) Inventors: Yang Lu, Mountain View, CA (US); George Alban Heitz, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 201 days.

(21) Appl. No.: 14/019,010

(22) Filed: Sep. 5, 2013

(51) Int. Cl.
*G06F 17/30* (2006.01)

(52) U.S. Cl.
CPC ................ *G06F 17/30542* (2013.01)

(58) Field of Classification Search
None
See application file for complete search history.

(56) References Cited

U.S. PATENT DOCUMENTS

| | | | |
|---|---|---|---|
| 2006/0089912 A1* | 4/2006 | Spagna et al. | 705/51 |
| 2012/0310762 A1 | 12/2012 | Robbin et al. | |
| 2013/0305385 A1* | 11/2013 | Korteweg et al. | 726/27 |

FOREIGN PATENT DOCUMENTS

WO 2012089288 A1 7/2012

OTHER PUBLICATIONS

Barzilai T et al. "Universal hash Function" IP.com Journal, IP.com Inc., West Henrietta NY, USA Jan. 2, 1990.
Chachin, C. and Schunter M., "A Cloud You Can Trust" IEEE Spectrum, IEEE New York US vol. 48, No. 12, Dec. 2, 2011, pp. 28-51.
Furregoni, E. et al. "The Mobile Digital Contents Distribution Scenario" International Conference on the Management of Mobile Business, 2007, Toronto ON Canada, Conference Proceedings, IEEE Computer Society, Los Alamitos CA, Jul. 9, 2007 p. 32.
International Search Report and Written Opinion in PCT/US2014/044251 mailed Oct. 9, 2014.
Torresani, L. et al. "Learning query-dependent prefilters for scalable image retrieval" 2009 IEEE conference on Computer Vision and Pattern Recognition: CVPR 2009, Miami Florida 2009 IEEE Jun. 20, 2009 pp. 2615-2622.

* cited by examiner

*Primary Examiner* — Rehana Perveen
*Assistant Examiner* — Raheem Hoffler
(74) *Attorney, Agent, or Firm* — Morris & Kamlay LLP (57) ABSTRACT

A system and method for managing music associated with a user account of an online music provider including receiving a request from a client device to add a song to the user account. A first match search is performed for the corresponding hash pair in a matching pipeline. Each hash pair in the matching pipeline includes a logical link corresponding to a song in a master repository. A second match search is performed when the first match search determines that the song is missing from the master repository. The second match search includes fingerprint matching. The song is associated with the user account when either first or second match search identifies the song to be in the master repository. An upload of the song to the online music provider is requested when the first and second match search determines that the song is missing from the master repository.

20 Claims, 5 Drawing Sheets

FIG. 6

MUSIC IDENTIFICATION

BACKGROUND

The disclosed embodiments relate generally to online music providers.

Users typically store their music data files in an online storage services on the Internet such as storage on a cloud server. However, the users' online storage demand is increasing at a rapid rate. Further, many users are storing the same, identical music data files. Further still, many users subscribe to online music providers' services that allow the users access to the additional copies of the same, identical music data files. As a result, multiple copies of the same music data files are often stored in the online music provider's online storage service, further driving demand for storage space and data management and serving systems.

SUMMARY

Broadly speaking, a system and method for identifying a music data file to be uploaded to minimize duplication of storage of the same music data file. It should be appreciated that the present disclosure can be implemented in numerous ways, including as a process, an apparatus, a system, computer readable media, or a device. Several inventive embodiments of the present disclosure are described below.

One embodiment provides a method for managing music associated with a user account of an online music provider. The method includes receiving a request from a client device to add a song to the user account, the request including multiple data items corresponding to the song. A first set of the data items corresponding to the song are processed into a hash pair. A first match search is performed using the hash pair including a metadata hash and an audio hash that corresponds to the song in a matching pipeline. The matching pipeline includes multiple preprocessed hash pairs, each of the preprocessed hash pairs in the matching pipeline having a logical link corresponding to a song in a master repository of the online music provider. A second match search is performed when the first match search determines that the song is missing from the master repository. The second match search includes performing fingerprint matching using a second set of the data items corresponding to the song. The song is associated with the user account when either first or second match search identifies the song to be present in the master repository. A request to upload the song to the online music provider is sent to the client device when the first and second match search determines that the song is missing from the master repository.

Another embodiment includes a server such as for the online music provider. The server includes memory and a processor. The processor configured to execute program instructions for receiving a request from a client device to add a song to the user account. The request includes multiple data items corresponding to the song. A first match search is performed using a hash pair of the song. The first match search performed on a database of preprocessed hash pairs corresponding to songs in a master repository of the online music provider, each of the preprocessed hash pairs having a logical link corresponding to a song in the master repository. The identified song in the master repository is associated with the user account when the first match search identifies the song to be in the master repository.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

DETAILED DESCRIPTION

Several example embodiments for systems, methods and apparatus for identifying a music data file to be uploaded to minimize duplication of storage of the same music data file will now be described. It will be apparent to those skilled in the art that the present disclosure may be practiced without some or all of the specific details set forth herein.

Identifying matching music, e.g., data files containing the music content can eliminate duplication and reduce the demands on the servers of an online music content vender service. Eliminating duplication of stored content, data files allows the servers to respond to requests of content and serve the data files containing the music content more efficiently and more quickly and thus enhancing the end user's experience with the online music content vendor service.

Figure 1:
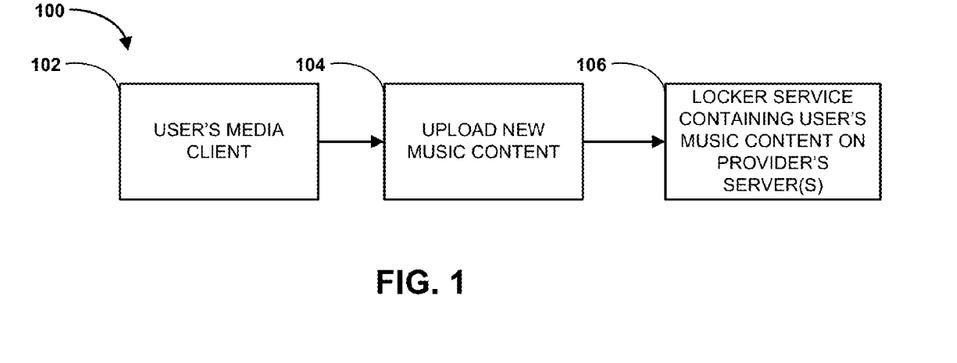
FIG. 1 is a simplified block diagram of a music data file, online storage system, for implementing embodiments of the present disclosure.

FIG. 1 is a simplified block diagram of a music data file, online storage system 100, for implementing embodiments of the present disclosure. The online storage system 100 includes a user's music content client 102 and a locker service 106. The user's music content client 102 is linked, via a network such as the Internet, to the locker service 106. Locker service 106 is typically included in a user's account in an online music content vender service. A request to upload new music content 104 can originate in the user's music content client 102 and received in the locker service 106.

The user's music content client 102 can be on several different devices such as a computer, a tablet, a smart phone or other Internet enabled device. User's music content client 102 can be limited to display data presented on the user's device.

The display data can include logical links, such as hyperlinks and similar logical mapping links and pointers, to applications that can produce the desired function. The functional applications can be hosted on the user's device or on an online music provider's server or combinations thereof. Example functions include functions to select music content for playback, purchase, and/or upload to the user's locker service 106.

The user's locker service 106 is an online storage medium for storing the user's music content files. User's often purchase new music content from sources such as the online music provider or another source such as a compact disc or another online music provider. Once the user has possession of the new music the user may wish to store the new music content in the user's locker service 106.

The user then initiates an upload request 104 to upload the new music content to the user's locker service 106. The upload request 104 is received by the online music provider's server. Applications on the online music provider's server then upload the new music content to the user's locker service 106.

Figure 2:
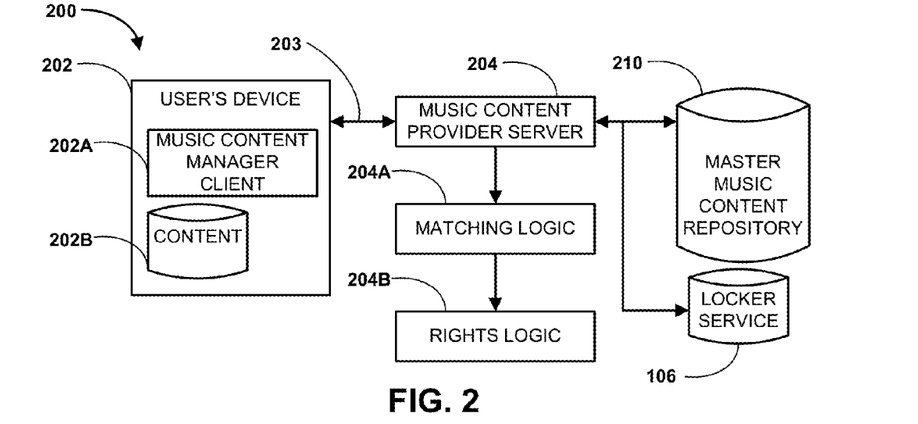
FIG. 2 is a simplified block diagram of a matching system, for implementing embodiments of the present disclosure.

FIG. 2 is a simplified block diagram of a matching system 200, for implementing embodiments of the present disclosure. The matching system 200 includes the user device 202, a online music provider server 204 and a master music content repository 210. The online music provider server 204 includes the typical server components of a processor and memory systems and also includes access rights logic 204B and a matching pipeline that includes a matching logic 204A.

The user device 202 includes the components such as a processor, a memory, a network interface, and applications as may be needed to access the online music provider server 204 via a network 203 such as the Internet. The user device 202 can also include a music content manager client 202A. The user's device 202 can also include some portion of the user's music content 202B stored in the memory system of the user device. The portion of the user's music content 202B can include logical links for mapping or pointing to the user's music content stored in the user's locker service 106.

Often users will subscribe to access repositories 210 of music content that the online music provider has access rights to distribute or otherwise sell access to. The online music provider stores this content in one or more repositories 210. There may be many different versions of each music file in the repositories 210. By way of example, the repository 210 can include one or more recordings of live performance versions of a selected song, different studio recordings of the selected song, acoustic or non-acoustic recordings, different mixes, etc.

The repository 210 can also include several different qualities of a selected version of the selected song. By way of example, the repository 210 can include lower music quality data file or a compressed music data file such as an MP3 of the selected song and also include a high music quality, uncompressed music data file of the selected song.

As a result the repository 210 can include many versions of the selected song. When the user's locker service 106 is also provided by the online music provider, duplicate music data files may exist in both the user's locker service and the repository 210. The duplicate music data files increase the storage capacity demand on the online music provider and also increase the server demand for finding and serving the music data files in response to a request to stream a music data file. A system for matching music data files can be used to reduce these impacts on the online music provider servers and services.

Figure 3:
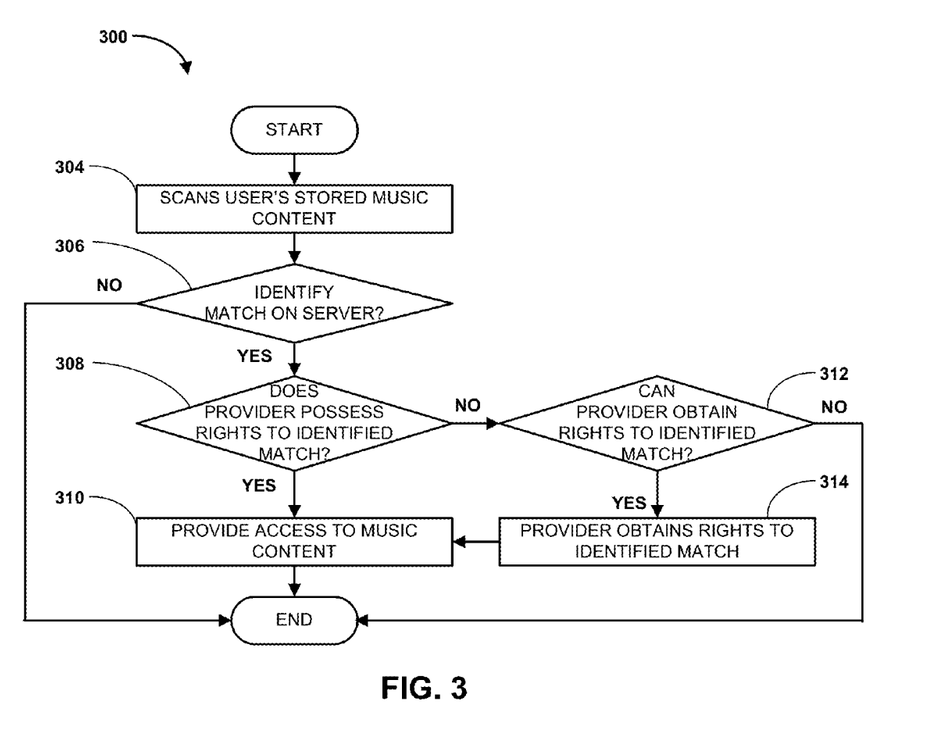
FIG. 3 is a flowchart of a matching system method operations, for implementing embodiments of the present disclosure.

FIG. 3 is a flowchart of a matching system method operations 300, for implementing embodiments of the present disclosure. The matching system method operations 300 can be performed in real-time or alternatively off-line, e.g., not in real time. In an operation 304, the user music content stored in the user's locker service 106 is scanned to identify the music data files containing the music content.

In an operation 306, each of the identified music data files containing the music content are compared by the matching logic 204A to the music data files previously stored in the repository 210. The music data files previously stored in the repository 210 may also include music data files stored in other users' locker service 106. If no match is found, then the method operations can end. If a match is found in the method operations continue in an operation 308.

In operation 308, the rights logic 204B reviews the identified matching music data files and determines if the online music provider possesses rights to distribute the matching music data file.

If, in operation 308, the online music provider possesses rights to distribute the matching music data file, then in an operation 310, a logical link mapped to or pointing to or otherwise providing access to the matching music data file in the repository 210 is placed in the user's locker service 106 in place of the duplicate matching music data file. And the method operations can end.

If, in operation 308, the online music provider does not possess rights to distribute the matching music data file, then in an operation 312, the rights logic 204B determines if the online music provider can obtain rights to distribute the matching music data file.

If in operation 312, the online music provider cannot obtain rights to distribute the matching music data file then the method operations can end. Alternatively, if in operation 312, the online music provider can obtain rights to distribute the matching music data file then, the method operations continue in operation 314 in which the online music content provider service obtains rights to distribute the matching music data file and the method operations continue in operation 310 as described above.

Figure 4:
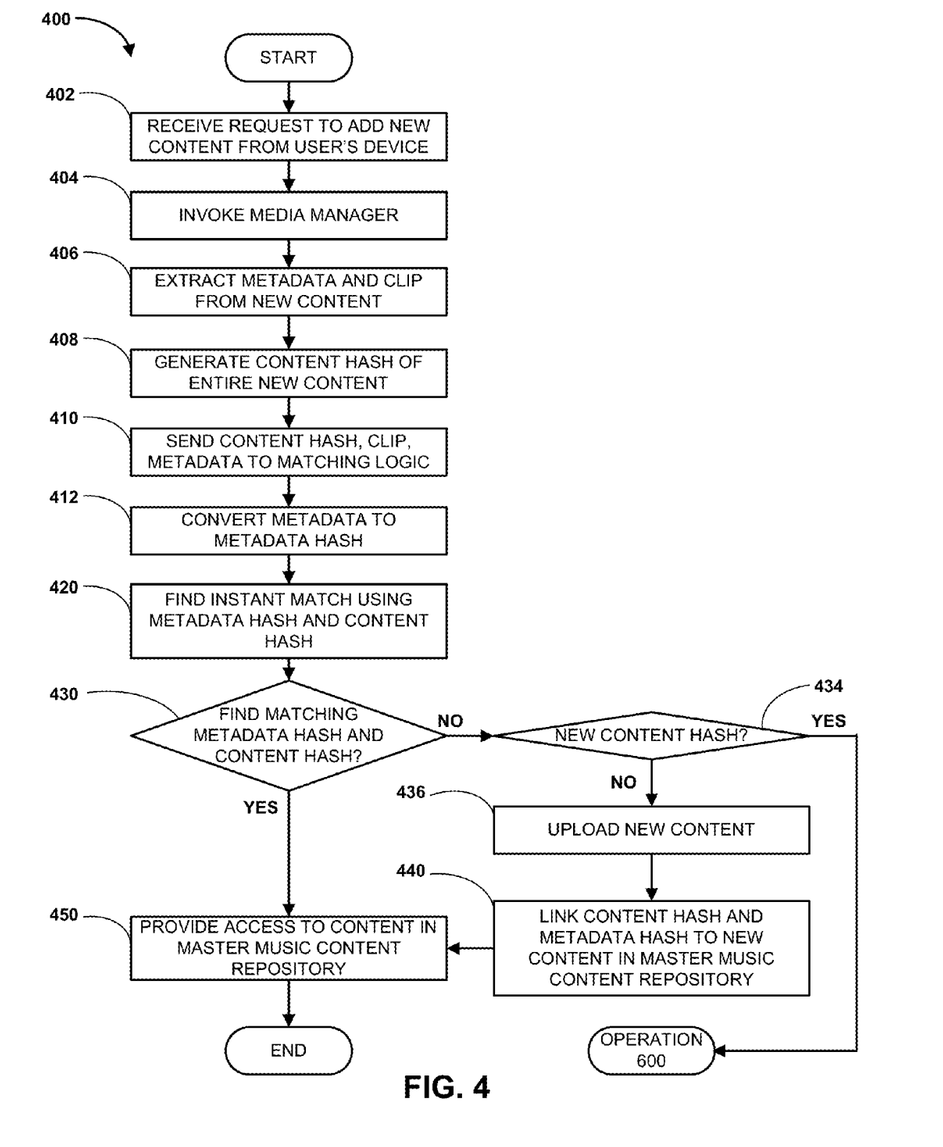
FIG. 4 is a flowchart of an alternative matching system method operations, for implementing embodiments of the present disclosure.

FIG. 4 is a flowchart of an alternative matching system method operations 400, for implementing embodiments of the present disclosure. In an operation 402 an online music provider server receives a request to add new music content. The add new music content request can be received from the user's device.

The online music provider server invokes a media manager application in an operation 404. In an operation 406, the media manager application extracts metadata of the new music data file and a sample clip of the new music data file requested to be added in the add new music content request.

In an operation 408, the media manager application generates a content hash from the entire new music data file requested to be added in the add new music content request. The content hash represents the entire new music data file rather than only a small portion, e.g., the sample clip, of the new music data file.

In an operation 410, the media manager application generates a metadata hash of the metadata of the new music data file. The metadata hash can represent the entire metadata or a portion of the metadata. The metadata hash is generated by hashing over the entire metadata bytes, including song titles, artist titles and album release titles and other metadata as may correspond to the new music data file.

In an operation 412, the online music provider server sends the content hash and the metadata hash to a matching logic 204A. The matching logic 204A in a matching pipeline applies an instant match logic using only the metadata hash and the content hash, in an operation 420. The instant match logic compares the metadata hash and the content hash to a database of previously matched content that is stored in the online music provider's master music content repository 210. Each of the data files containing the music content in the master music content repository 210 is linked to a corresponding metadata hash and the content hash referred to as a hash pair for the corresponding data files containing the music content.

If, in operation 430, the instant match logic finds a match to the metadata hash and the content hash then the method operations continue in an operation 450. The instant match logic provides the source of the request to add new music content access to the matching data files containing the music content stored in the master music content repository 210 in operation 450 and the method operations can end. Providing access to the matching music data files stored in the master music content repository 210 can include a logical link mapping any future requests for the new music in the user's locker service 106 account to the corresponding data files containing the music content.

Providing access to the matching music data files stored in the master music content repository 210 can include storing a logical link to the matching music data files in the corresponding user's locker service 106 account. Providing access to the matching music data files stored in the master music content repository 210 can also or alternatively include providing a logical link to the matching music data files to the requesting device as an acknowledgement that the add new music content request has been completed.

If, in operation 430, the instant match logic fails to find a match to the metadata hash and the content hash then the method operations continue in an operation 434. In operation 434, the content hash is examined to determine if the content hash new. A new content hash is a content hash that has not been previously processed through the foregoing method operations. If the content hash is new then the method operations continue in the method operations 500 as described in FIG. 5 below.

If the content hash is not new then the method operations continue in an operation 436 where the requested new content is uploaded and the method operations continue in an operation 440.

In operation 440, the content hash and the metadata hash, e.g., hash pair, are linked to the newly uploaded content in the master music content repository 210 and the method operations continue in operation 450 as described above Linking the hash pair to the newly uploaded content in the master music content repository 210 allows instant matching in any future instant match searches as described in operation 420 above.

Figure 5:
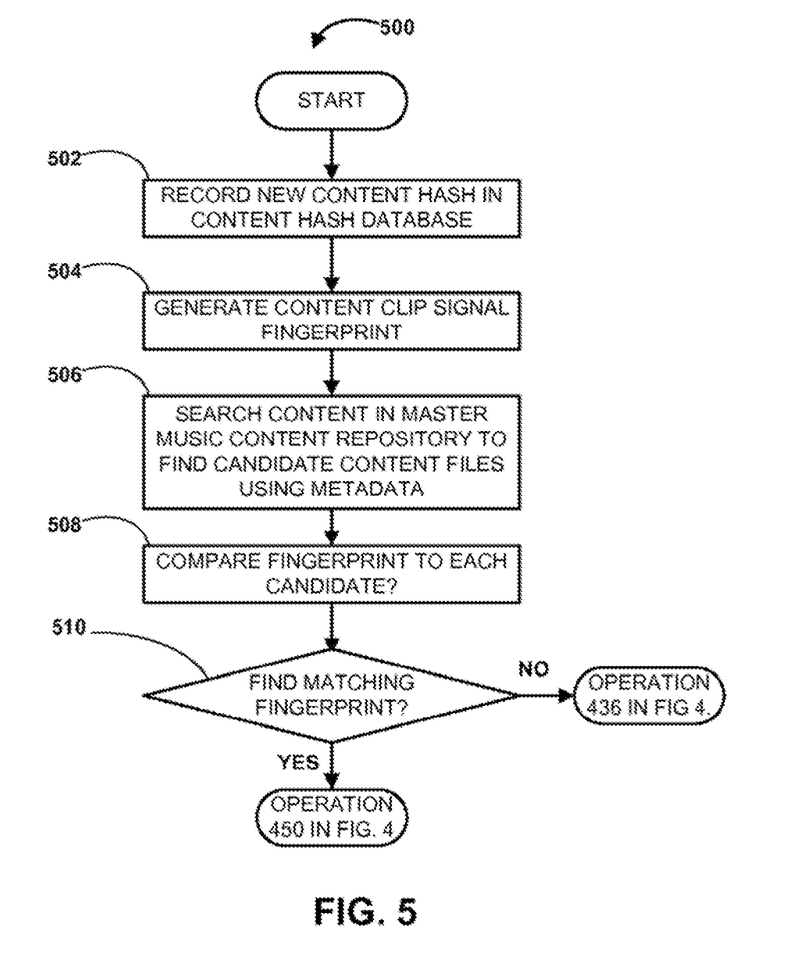
FIG. 5 is a flowchart of the method operations of linking a content hash and metadata hash to new content, for implementing embodiments of the present disclosure.

FIG. 5 is a flowchart of the method operations 500 of processing a new content hash, for implementing embodiments of the present disclosure. In an operation 502 the new content hash is recorded in a content hash database.

In an operation 504, a sample portion or clip of the content is selected and a content clip signal fingerprint is generated. The content clip signal fingerprint represents the selected clip and not the entire data files containing the music content.

In an operation 506, the data files containing the music content stored in the master music content repository 210 is searched to identify one or more candidate data files containing the music content using the metadata of the new data files containing the music content. Candidate data files containing the music content will include matches to at least a portion of the metadata of the new data files containing the music content. Typically, there may be multiple data files containing the music content of any given song. Some of the candidate data files containing the music content of the same song are identical and the metadata is incomplete or partially missing or partially wrong. Some of the candidate data files containing the music content of the same song are not identical data files as they may be different versions of the same song but may have at least a portion of matching metadata.

In an operation 508, the content clip signal fingerprint is compared to each of the one or more candidate data files containing the music content. If a matching fingerprint is found in an operation 510, then the method operations continue in operation 450 of FIG. 4 as described above. If a matching fingerprint is not found in operation 510, then the method operations continue in operation 436 of FIG. 4 as described above. When multiple matching fingerprints are found, a very common occurrence, all of the matches are recorded. Further, as described in more detail below, one fingerprint will be selected with the rights from entire match list.

Figure 6:
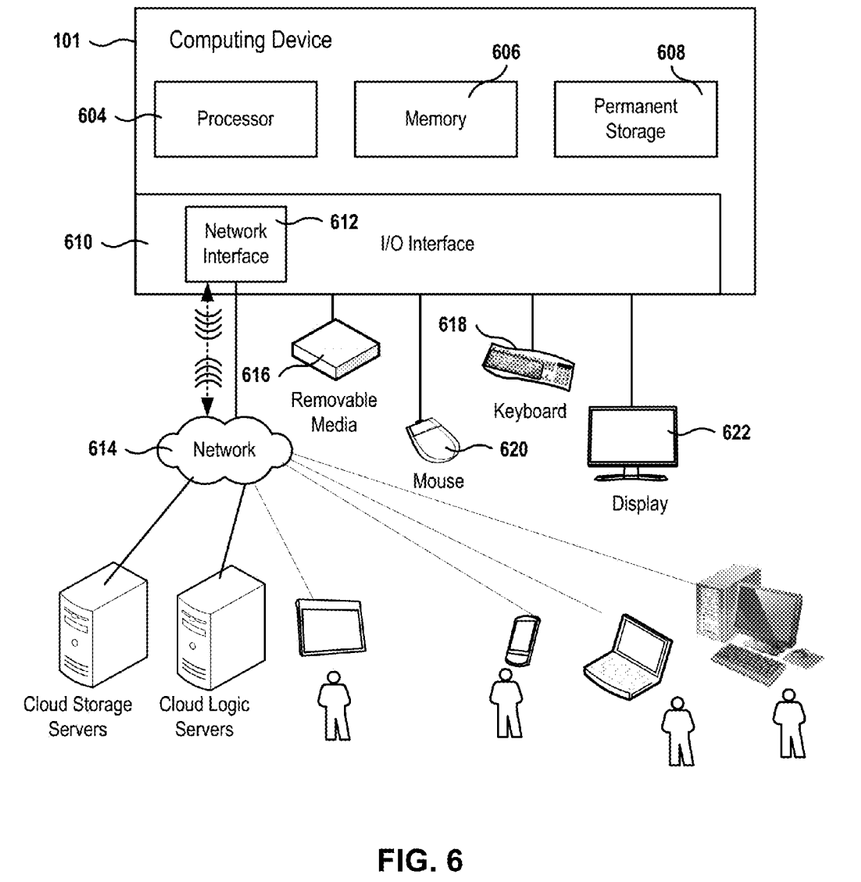
FIG. 6 is a simplified schematic diagram of a computer system for implementing embodiments of the present disclosure.

FIG. 6 is a simplified schematic diagram of a computer system 101 for implementing embodiments of the present disclosure. FIG. 6 depicts an example computer environment for implementing embodiments of the disclosure. It should be appreciated that the methods described herein may be performed with a digital processing system, e.g., a conventional, general-purpose computer system. Special purpose computers, which are designed or programmed to perform only one function, may be used in the alternative. The computer system 101 includes a processor 604, which is coupled through a bus to memory 606, permanent storage 608, and Input/Output (I/O) interface 610.

Permanent storage 608 represents a persistent data storage device e.g., a hard drive or a USB drive, which may be local or remote. Network interface 612 provides connections via network 614, allowing communications (wired or wireless) with other devices. It should be appreciated that processor 604 may be embodied in a general-purpose processor, a special purpose processor, or a specially programmed logic device. Input/Output (I/O) interface 610 provides communication with different peripherals and is connected with processor 604, memory 606, and permanent storage 608, through the bus. Sample peripherals include display 622, keyboard 618, mouse 620, removable media device 616, etc.

Display 622 is configured to display the user interfaces described herein. Keyboard 618, mouse 620, removable media device 616, and other peripherals are coupled to I/O interface 610 in order to exchange information with processor 604. It should be appreciated that data to and from external devices may be communicated through I/O interface 610. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 608, network attached storage (NAS), read-only memory or random-access memory in memory module 606, Compact Discs (CD), Blu-ray™ discs, flash drives, hard drives, magnetic tapes, and other data storage devices. The non-transitory computer readable storage medium may be distributed over a network coupled computer system so that the computer readable code is stored and executed in a distributed fashion.

Additionally, FIG. 6 shows various types of devices that can connect to the network, e.g., the Internet. The devices include servers, tablet computers, smartphones, laptops, desktops, etc. The various devices and run operating systems and the operating systems can vary from manufacturer to manufacturer.

Some, or all operations of the method presented herein are executed through a processor, e.g., processor 604 of FIG. 6. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

Any of the operations described herein that form part of the disclosure are useful machine operations. The disclosure also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The disclosure can also be embodied as computer readable code and/or logic on a computer readable medium. The computer readable medium is any data storage device that can store data which can thereafter be read by a computer system. Examples of the computer readable medium include hard drives, network attached storage (NAS), logic circuits, read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in the above figures are not required to be performed in the order illustrated, and that all the processing represented by the operations may not be necessary to practice the disclosure. Further, the processes described in any of the above figures can also be implemented in software stored in any one of or combinations of the RAM, the ROM, or the hard disk drive.

Although the foregoing has been described in some detail for purposes of clarity of understanding, it will be apparent that certain changes and modifications may be practiced within the scope of the appended claims. Accordingly, the present embodiments are to be considered as illustrative and not restrictive, and the disclosed concepts and ideas are not to be limited to the details given herein, but may be modified within the scope and equivalents of the appended claims.

What is claimed is:

1. A method for managing music associated with a user account of an online music provider, comprising:
   receiving a request from a client device to add a song to the user account, the request including a plurality of data items of the song, the plurality of data items including a hash pair comprising a content hash of an entire music data file of the song and a metadata hash of metadata of the song;
   performing a first match search for the hash pair in a matching pipeline having a plurality of preprocessed hash pairs, each of the preprocessed hash pairs in the matching pipeline having a logical link corresponding to a song in a master repository of the online music provider;
   performing a second match search when the first match search determines that the song is missing from the master repository, the second match search including performing fingerprint matching using a content clip signal fingerprint of the song;
   associating the song to the user account when either first or second match search identifies the song to be in the master repository; and
   requesting upload of the song to the online music provider when the first and second match search determines that the song is missing from the master repository.

2. The method of claim 1, further comprising,
   before performing the second match search,
   determining if the first match search has been previously applied to the hash pair;
   skipping the second match search; and
   proceeding with the requesting of transfer of the song to the online music provider, the transfer of the song being to a music locker of the user account that is not part of the master repository.

3. The method of claim 1, wherein the upload of the song is to a music locker of the user account, the music locker being storage that is separate from storage of the master repository.

4. The method of claim 1, wherein the plurality of data items of the song include metadata of the song, an audio clip of the song, and an audio hash of the song.

5. The method of claim 1, wherein the hash pair includes an audio hash and a metadata hash obtained from the plurality of data items of the song.

6. The method of claim 1, wherein the matching pipeline having a plurality of preprocessed hash pairs is a database of hash pairs that are processed offline.

7. The method of claim 1, wherein the second match search uses metadata and an audio clip from the plurality of data items, the metadata used to identify at least one candidate song from the master repository and the audio clip is processed to identify a fingerprint signal, the fingerprint signal used identify if a match for the song exists in the at least one candidate song.

8. The method of claim 1, wherein associating the song to the user account when either the first or the second match search identifies the song to be in the master repository includes delivering the logical link to the identified song in the master repository to the client device.

9. The method of claim 1, wherein associating the song to the user account when either the first or the second match search identifies the song to be in the master repository includes storing the logical link to the identified song in the master repository in a music locker of the user account.

10. The method of claim 1, wherein the master repository includes data files for songs for which the online music provider possesses distribution rights.

11. A method, comprising:
    receiving a request from a client device to add a song to a user account, the request including a plurality of data items of the song;
    performing a first match search for a hash pair of the song, the hash pair comprising a content hash of an entire music data file of the song and a metadata hash of metadata of the song, and the first match search being performed on a database having a plurality of preprocessed hash pairs corresponding to songs in a master repository of an online music provider, each of the preprocessed hash pairs having a logical link corresponding to a song in the master repository; and
    associating the song to the user account when the first match search identifies the song to be in the master repository.

12. The method of claim 11, further comprising,
    performing a second match search when the first match search determines that the song is missing from the master repository, the second match search includes performing fingerprint matching using a content clip signal fingerprint of the song.

13. The method of claim 11, further comprising, requesting upload of the song to the online music provider when the first and second match search determines that the song is missing from the master repository.

14. The method of claim 11, wherein associating the song to the user account when either the first or the second match search identifies the song to be in the master repository includes at least one of delivering the logical link to the identified song in the master repository to the client device or storing the logical link to the identified song in the master repository in a music locker of the user account.

15. The method of claim 11, wherein the master repository includes data files for songs for which the online music provider possesses distribution rights.

16. A server, comprising:
memory and a processor, the processor configured to execute program instructions for,
receiving a request from a client device to add a song to the user account, the request including a plurality of data items of the song, the plurality of data items including a hash pair comprising a content hash of an entire music data file of the song and a metadata hash of metadata of the song;
performing a first match search for a hash pair of the song, the first match search performed on a database having a plurality of preprocessed hash pairs corresponding to songs in a master repository of an online music provider, each of the preprocessed hash pairs having a logical link corresponding to a song in the master repository;
associating the song to the user account when the first match search identifies the song to be in the master repository.

17. The server of claim 16, further comprising, program instructions for performing a second match search when the first match search determines that the song is missing from the master repository, the second match search includes performing fingerprint matching using a content clip signal fingerprint of the song.

18. The server of claim 16, further comprising, program instructions for requesting upload of the song to the online music provider when the first and second match search determines that the song is missing from the master repository.

19. The server of claim 16, wherein associating the song to the user account when the first match search identifies the song to be in the master repository includes at least one of delivering the logical link to the identified song in the master repository to the client device or storing the logical link to the identified song in the master repository in a music locker of the user account.

20. The server of claim 16, wherein the master repository includes data files for songs for which the online music provider possesses distribution rights.

* * * * *